Figure 1:
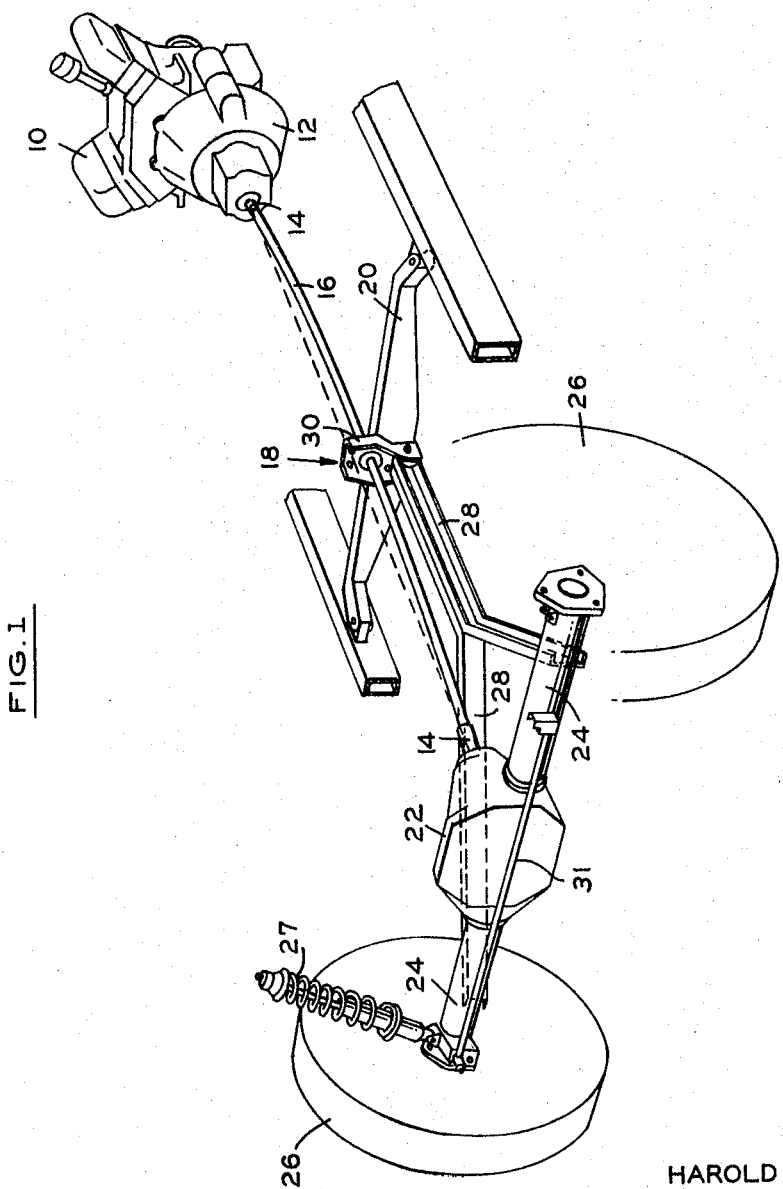

May 9, 1967  H. W. JOHNSON ETAL  3,318,410

FLEXIBLE DRIVE SHAFT

Filed March 2, 1965  3 Sheets-Sheet 1

HAROLD W. JOHNSON
JAMES KNOWLES
THOMAS R. STOCKTON
INVENTORS

BY John R. Faulkner
Robert E. McCollum
ATTORNEYS

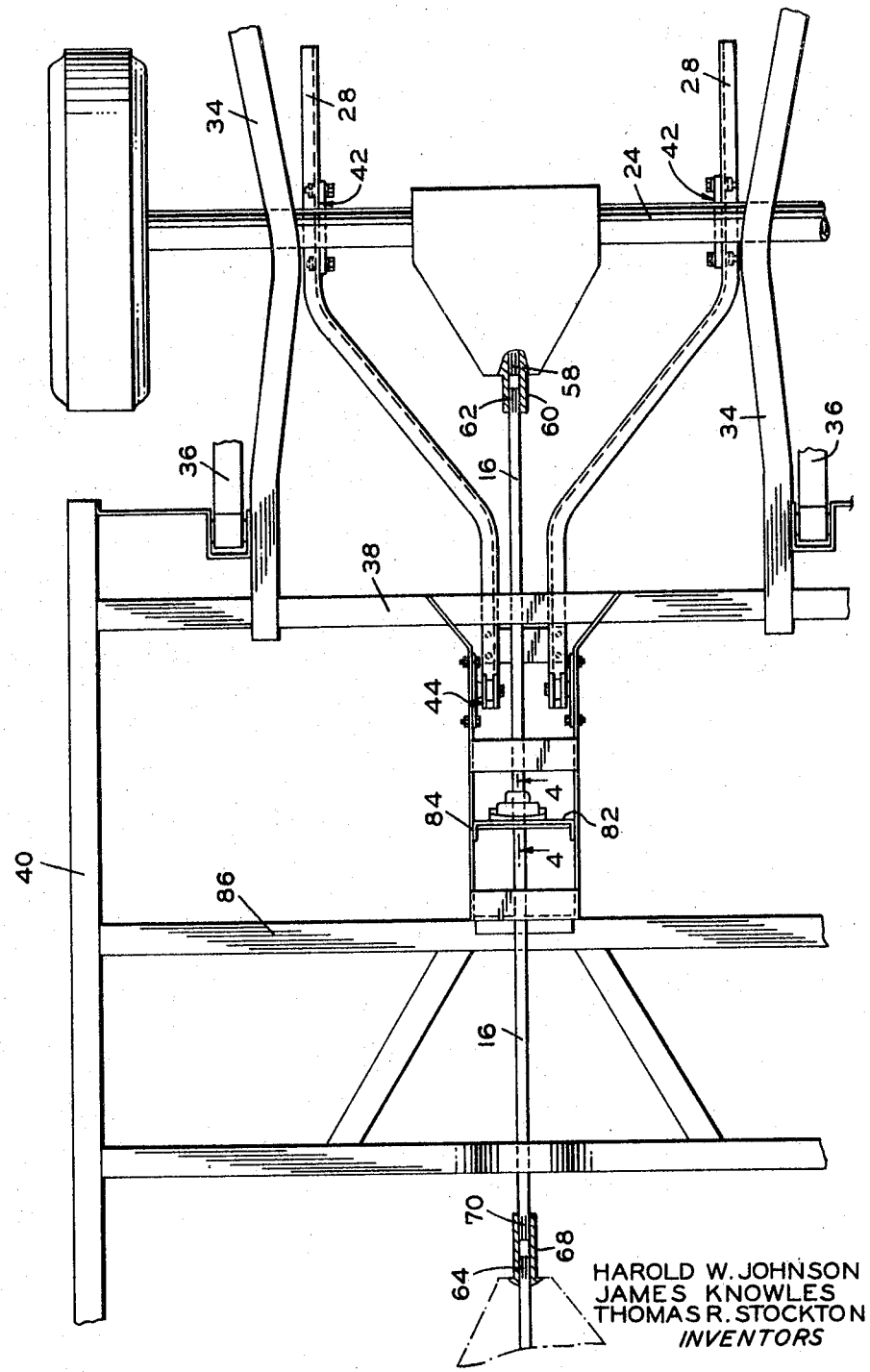

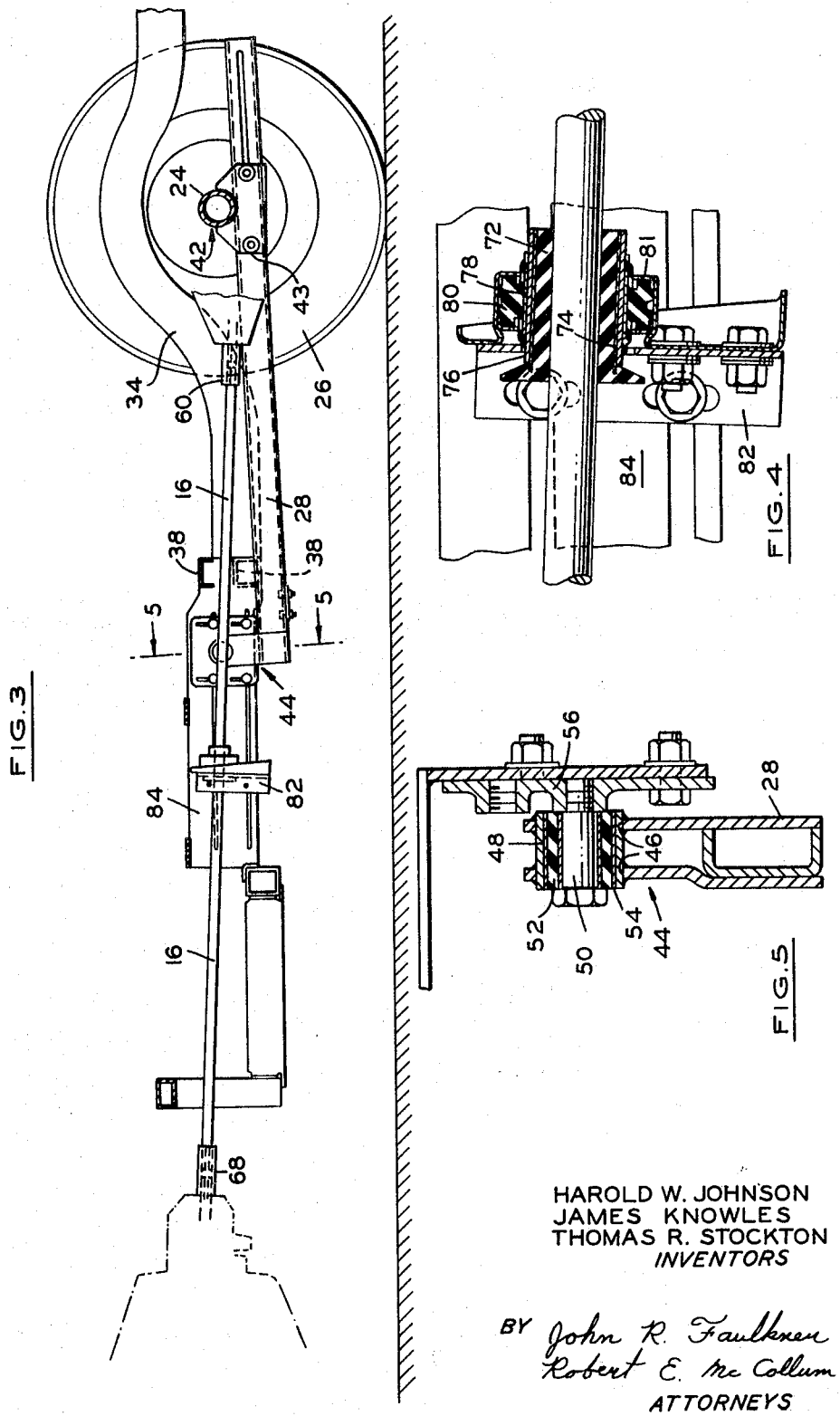

United States Patent Office 3,318,410
Patented May 9, 1967

3,318,410
FLEXIBLE DRIVE SHAFT
Harold W. Johnson, Farmington, James Knowles, Bloomfield Hills, and Thomas R. Stockton, Northville, Mich., assignors to Ford Motor Company, Dearborn, Mich., a corporation of Delaware
Filed Mar. 2, 1965, Ser. No. 436,474
6 Claims. (Cl. 180—70)

This invention relates in general to an automotive vehicle. More particularly, it relates to a flexible drive shaft construction and support for connecting a motor vehicle transmission output shaft to the rear axle.

One of the principal objects of the invention is to provide a motor vehicle with a drive shaft that reduces the height of the conventional tunnel that extends longitudinally through the passenger compartment of the vehicle, and, therefore, improves the comfort of the rear seat passengers.

Another object of the invention is to provide a drive shaft construction that eliminates the conventional universal joints between the transmission output shaft and the input to the differential. This results in a material cost saving over conventional constructions.

The invention accomplishes the above objectives by providing a small diameter flexible drive shaft that has splined connections at opposite ends to the transmission output shaft and to the input to the differential. An intermediate portion of the drive shaft is slidably and rotatably mounted in a bearing assembly secured to the vehicle frame.

The differential-rear axle assembly is pivotally connected to the vehicle frame near an intermediate portion of the shaft. Rocking movement of the rear axle, therefore, bends the flexible shaft, axial compliance being accommodated by the end splined connection of the shaft. Slight lateral compliance is accommodated by a rubber mount portion of the midframe bearing.

Other objects, features and advantages of the invention will become apparent upon reference to the succeeding, detailed description thereof, and to the drawings illustrating the preferred embodiment thereof; wherein, FIGURE 1 illustrates schematically, in perspective, a motor vehicle drive train assembly embodying the invention;

FIGURE 2 is a plan view of details of assembly of a construction similar to the FIGURE 1 showing;

FIGURE 3 is a side-elevational view, with parts broken away and in section, of parts of the FIGURE 2 showing; and FIGURES 4 and 5 are enlarged cross-sectional views of details taken on planes indicated by and viewed in the direction of arrows 4—4 and 5—5 of FIGURES 2 and 3, respectively.

FIGURE 1 shows a motor vehicle drive train having an engine 10 fixed to a transmission 12. The engine is generally supported on the vehicle frame, not shown, by side mounts between the engine and frame and mounts between the transmission and frame. The transmission output shaft is splined into one end of a sleeve 14 that also slidably receives the splined end of a small diameter flexible drive shaft 16. The drive shaft extends slidably and rotatably through a midframe bearing structure 18 secured to a cross-member 20 of the frame. The shaft continues rearwardly for a slidably splined connection to a conventional differential 22.

A pair of axle shaft housings 24 extend laterally from the differential housing, and are suitably secured to the housing of a pair of drive wheels 26. The rear axle assembly supports the vehicle frame on a pair (only one shown) of spring strut members 27. A pair of channel-shaped arms 28 are rigidly fixed at one end to the axle casings and converge forwardly for a pivotal connection to a support bracket 30 secured to cross-frame member 20. The arms 28 permit pivotal movement of the entire rear axle assembly through jounce and rebound, and torsionally resist roll of the assembly and/or frame. A stabilizer bar 31 is also provided.

FIGURES 2, 3 and 4 show more clearly some of the details of construction of the connecting portions of the drive shaft to the differential and transmission and to the intermediate supporting portion of the frame. FIGURE 2 shows the wheels 26 and rear axle assembly movable therewith during jounce and rebound. The frame of the vehicle includes two side rail members 34 that extend over the rear axle and are supported upon it by leaf spring members 36, in this case. The frame members 34 extend forwardly to a cross-beam 38 to which they are welded or secured in any suitable manner. Side frame members 40 extend forwardly to the front of the vehicle to provide a support (not shown) for the engine and transmission package.

The arms 28 are each fixedly secured at their rear portions to rear axle casings 24 by means of a serrated clamp structure 42 that is provided with suitable slots 43 (FIGURE 3) for adjustment purposes. The arms 28 extend forwardly in a converging manner previously described, and are formed at their forward ends with a yoke-type member 44 (FIGURE 5). This latter member has aligned openings 46 in which is secured a sleeve 48. The sleeve rotatably supports the shank of a bolt 50 surrounded by an elastic or rubber bushing 52 between bearing sleeves 54. Bolt 50 is adjustably secured and fixed to a supporting plate 56 fixed to frame portion 38.

From the foregoing, it will be clear that the arms 28 are pivotally connected to the midframe portion 38 of the vehicle in a manner to straddle the flexible drive shaft 16.

Turning now to the assembly of drive shaft 16, the differential has a power input or pinion shaft 58 that is splined into one end of an internally splined sleeve 60. The opposite end of sleeve 60 receives the splined end 62 of flexible drive shaft 16. This connection permits the necessary axial sliding movement of drive shaft 16 with respect to the differential. The drive shaft 16 extends forwardly to transmission 12. The transmission power output shaft 64 is similarly splined within an internally splined sleeve 48. This latter sleeve slidably receives the mating splined end 70 of drive shaft 16.

The intermediate portion of drive shaft 16 is supported upon frame 38 for both a sliding axial movement of the shaft and also radial displacement. These movements occur due to the misalignment of the shaft with the horizontal axis of the vehicle during bending of the shaft upon pivotal movement of the rear axle assembly. More specifically, as seen in FIGURE 4, a rubber-like, elastic, or elastomer split sleeve 72 having a split tubular casing 74 is placed over an intermediate portion of drive shaft 16. It is pressfitted against the shaft so as to be non-movable axially with respect to it by an annular metal sleeve 76 of a smaller internal diameter than casing 74. A flat annular bearing member 78 is mounted on sleeve 76, and is backed by a seal structure 80 that is enclosed within a housing or bearing retainer 81. The outer portion of the bearing retainer 81 is bolted, as shown, to a supporting structure 82 that in turn is fixed to a box structure 84 supported between the cross-beams 38 and 86. With this construction, axial sliding movement of shaft 16 during bending upon pivotal movement of the rear axle in jounce and rebound, causes the sliding movement to occur within the bearing itself rather than by a distortion of the rubber or elastomeric sleeve 72.

The sleeve will permit but resist lateral compliance in compression when the shaft bends and is misaligned with the longitudinal axis of the sleeve 72 and bearing.

In operation, the splined connections between the drive shaft 16 and the transmission and differential provide a drive of the rear wheels 26 at all times when the transmission output shaft is rotating. When the wheels move in jounce or rebound, such as during cornering, or when the wheels roll over an obstruction, the rear axle assembly will pivot upwardly or downwardly about its pivot bolts 50. This causes the drive shaft 16 to bend, which is permitted by its flexible construction. The bending causes a longitudinal or axial displacement of the drive shaft in an attempt to align its ends with the axis of the sleeves in which they are inserted to thereby prevent rupturing of the shaft during this condition of operation. The center or midframe support also permits an axial sliding of the drive shaft by the rubber sleeve 72 and sleeve 76 sliding with shaft 16 on the inner surface of bearing 78. The rubber sleeve 72 will deform slightly when the drive shaft becomes misaligned with the axis of the bearing. In actual practice, the geometry is chosen such that slip along the splines approaches zero. The shaft initially would have a slight curvature to reduce the stresses on this shaft due to the differences in transmission of torque during jounce and rebound and because of the differences in magnitude between jounce and rebound.

While the midframe support in FIGURE 2 is shown as being spaced from the pivotal connection of the arms 28 to the cross-frame member 38, it will be clear that the two supports could be at the same point, in a manner similar to that shown in FIGURE 1.

From the foregoing, it will be seen that the invention provides a single continuous flexible drive shaft connecting the output of the transmission to the input of the differential, and constructed in a manner such that it minimizes interference with the space in the passenger compartment.

While the invention has been illustrated in its preferred embodiments in the figures, it will be clear to those skilled in the arts to which the invention pertains that many changes and modifications may be made thereto without departing from the scope of the invention.

We claim:

1. A motor vehicle having a frame and an engine-transmission unit mounted on said frame, a rear axle pivotally connected to said frame about a transverse horizontal axis, and a one-piece flexible drive shaft connecting said transmission to said rear axle for a drive thereof, said drive shaft having splined connections at opposite ends to said transmission and rear axle, and means secured to said frame slidably supporting an intermediate portion of said shaft, said splined connections and slidable support means permitting bending of said shaft during pivotal movement of said rear axle about said axis.

2. A motor vehicle having a frame and an engine-transmission unit mounted on said frame, a rear axle pivotally connected to said frame about a transverse horizontal axis, and a one-piece flexible drive shaft connecting said transmission to said rear axle for a drive thereof, said drive shaft having splined connections at opposite ends to said transmission and rear axle, and bearing means secured to said frame slidably supporting an intermediate portion of said shaft, said splined connections and slidable support means permitting bending of said shaft during pivotal movements of said rear axle about said axis.

3. A motor vehicle having a frame and an engine connected transmission mounted on said frame, a rear axle assembly including a differential fixed thereto, means pivotally connecting said assembly to said frame about a transverse horizontal axis, said differential and transmission each having a driving sleeve connected thereto, a one-piece flexible drive shaft having opposite ends slidably splined in said sleeves, and a support secured to said frame supporting an intermediate portion of said shaft, said support having means permitting an axial sliding displacement of said shaft relative thereto, bending on said shaft upon pivotal movement of said assembly about said axis sliding said shaft on its splines and said support forcing the ends of said shaft to align themselves with the axes of said sleeves.

4. A motor vehicle having a frame and an engine connected transmission mounted on said frame, a rear axle assembly including a differential fixed thereto, means pivotally connecting said assembly to said frame about a transverse horizontal axis, said differential and transmission each having a driving sleeve connected thereto, a one-piece flexible drive shaft having opposite ends slidably splined in said sleeves, and a support secured to said frame adjacent the pivotal connection of said assembly to said frame supporting an intermediate portion of said shaft, said support having means permitting an axial sliding displacement of said shaft relative thereto, bending of said shaft upon pivotal movement of said assembly about said axis sliding said shaft on its splines and said support forcing the ends of said shaft to align themselves with the axes of said sleeves.

5. A motor vehicle having a frame and an engine-transmission unit fixed on said frame, a rear axle assembly including a differential fixed thereon, means connecting said assembly to said frame for a pivotal movement with respect thereto and to said engine-transmission unit about a transverse horizontal axis, a one-piece flexible drive shaft drive connecting said transmission and differential, spline means slidably connecting opposite ends of said shaft to said transmission and differential, means including bearing means secured to said frame surrounding and supporting an intermediate portion of said shaft for rotary and axial sliding movement thereof with respect to said frame, and deformable means between said bearing means and said portion of said shaft deformable upon misalignment of the axes of said shaft and bearing means upon bending of said shaft, said spline means and bearing means and deformable means permitting a bending of said shaft upon pivotal movement of said rear axle assembly about said axis.

6. A motor vehicle having a frame and an engine-transmission unit fixed on said frame, a rear axle assembly including a differential fixed thereon, a pair of arms fixed to said assembly at one end and pivotally connected about a transverse horizontal axis to said frame at their opposite ends, said means connecting said assembly to said frame permitting a pivotal movement with respect thereto and to said engine-transmission unit about said axis, a one-piece flexible drive shaft drive connecting said transmission and differential, spline means slidably connecting opposite ends of said shaft to said transmission and differential, means including bearing means secured to said frame surrounding and supporting an intermediate portion of said shaft for rotary and axial sliding movement of said shaft with respect to said frame, and deformable means between said bearing means and said portion of said shaft deformable upon misalignment of the axes of said shaft and bearing means upon bending of said shaft, said spline means and bearing means and deformable means permitting a bending of said shaft upon pivotal movement of said rear axle assembly about said axis.

References Cited by the Applicant

UNITED STATES PATENTS

| | | |
|---|---|---|
| 2,081,214 | 5/1937 | Anibal. |
| 2,092,291 | 9/1937 | Olsen. |
| 2,142,497 | 1/1939 | Clendenin. |
| 2,906,360 | 9/1959 | Daley. |
| 3,037,573 | 6/1962 | Larsen. |

A. HARRY LEVY, *Primary Examiner.*